United States Patent
Nagaratnam et al.

(10) Patent No.: US 10,528,748 B2
(45) Date of Patent: Jan. 7, 2020

(54) CONTEXT-DRIVEN ON-DEVICE DATA PROTECTION

(71) Applicant: International Business Machines Corporation, Armonk, NY (US)

(72) Inventors: Nataraj Nagaratnam, Cary, NC (US); Kapil K. Singh, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 15/136,094

(22) Filed: Apr. 22, 2016

(65) Prior Publication Data

US 2017/0308713 A1 Oct. 26, 2017

(51) Int. Cl.
| | |
|---|---|
| G06F 21/62 | (2013.01) |
| H04L 9/08 | (2006.01) |
| G06F 21/88 | (2013.01) |
| H04W 12/02 | (2009.01) |
| H04W 12/12 | (2009.01) |
| H04W 12/08 | (2009.01) |
| H04W 12/04 | (2009.01) |
| H04W 88/02 | (2009.01) |

(52) U.S. Cl.
CPC .......... *G06F 21/6218* (2013.01); *G06F 21/88* (2013.01); *H04L 9/0897* (2013.01); *H04W 12/02* (2013.01); *H04W 12/0802* (2019.01); *H04W 12/1206* (2019.01); *G06F 2221/2111* (2013.01); *H04L 2209/80* (2013.01); *H04W 12/04* (2013.01); *H04W 88/02* (2013.01)

(58) Field of Classification Search
CPC ... G06F 21/62; G06F 21/6209; G06F 21/6218
USPC ........................................................ 713/190
See application file for complete search history.

(56) References Cited

U.S. PATENT DOCUMENTS

| | | | |
|---|---|---|---|
| 7,957,532 B2 * | 6/2011 | Chen ................... | H04L 9/0822 380/270 |
| 8,788,804 B2 | 7/2014 | Nagaraja | |
| 8,812,875 B1 * | 8/2014 | Melvin ................ | G06F 21/78 380/277 |
| 9,330,275 B1 * | 5/2016 | Endresen ............ | G06F 21/6218 |
| 2007/0035390 A1 | 2/2007 | Thomas et al. | |
| 2009/0150970 A1 * | 6/2009 | Hinds .................. | G06F 21/88 726/1 |
| 2012/0163603 A1 * | 6/2012 | Abe ..................... | G01S 5/0263 380/278 |
| 2012/0257759 A1 * | 10/2012 | Nick .................... | H04L 9/0822 380/286 |
| 2012/0278579 A1 * | 11/2012 | Goss ................... | G06F 12/0246 711/166 |

(Continued)

*Primary Examiner* — Dant B Shaifer Harriman
(74) *Attorney, Agent, or Firm* — VanLeeuwen & VanLeeuwen; Jeffrey S. LaBaw

(57) ABSTRACT

An approach is provided that provides data protection in a mobile device. The approach monitors a set of sensor data at the mobile device to determine a current context of the mobile device. Sensor data can include data pertaining to the external environment as well as to the user's current interaction with the device. In response to determining a negative current context of the mobile device, the approach deletes an encryption/decryption key from the mobile device rendering the encrypted data on the device inaccessible to malevolent users and data thieves.

14 Claims, 6 Drawing Sheets

(56) References Cited

U.S. PATENT DOCUMENTS

2014/0273880 A1\* 9/2014 Sima .................... H04W 12/08
 455/68
2014/0359777 A1  12/2014 Lam et al.
2017/0046806 A1\* 2/2017 Haldenby .......... G06Q 20/0655

\* cited by examiner

CONTEXT-DRIVEN ON-DEVICE DATA PROTECTION

BACKGROUND OF THE INVENTION

Technical Field

This disclosure relates to protecting data stored on a device based on the current context found at the device.

Description of Related Art

Device theft and data loss are the biggest security challenges for today's mobile platforms. There are several solutions available that allow a user to track their device's location (e.g., via "Find Phone," etc.) and even remotely wipe sensitive data from the device (e.g., device management solutions, etc.) in the case where the device cannot be recovered. However, such approaches require the device to be accessible through the network. Unfortunately, it is common for dedicated or circumstantial device thieves to disconnect the device from the network before scrapping the data offline. Given a huge suite of tools and technologies available, both in software and hardware, for mobile forensics, a dedicated adversary would likely be able to obtain sensitive data from a device when faced with current data protection approaches.

Sensitive data could also be lost without the physical loss of device, for instance, via shoulder surfing, or due to temporary loss of control of the device. In such a scenario, the device stays online, however, the user might not be either aware of the data being leaked or the data might already be lost before any responsive action could be taken. While such leaks could be prevented owing to an intelligent human judgement on where and how to use the mobile device, one cannot rely on user's discretion alone as the user might not be aware of the risks posed by his/her environment.

SUMMARY

An approach is provided that provides data protection in a mobile device. The approach monitors a set of sensor data at the mobile device to determine a current context of the mobile device. Sensor data can include data pertaining to the external environment as well as to the user's current interaction with the device. In response to determining a negative current context of the mobile device, the approach deletes an encryption/decryption key from the mobile device rendering the encrypted data on the device inaccessible to malevolent users and data thieves.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
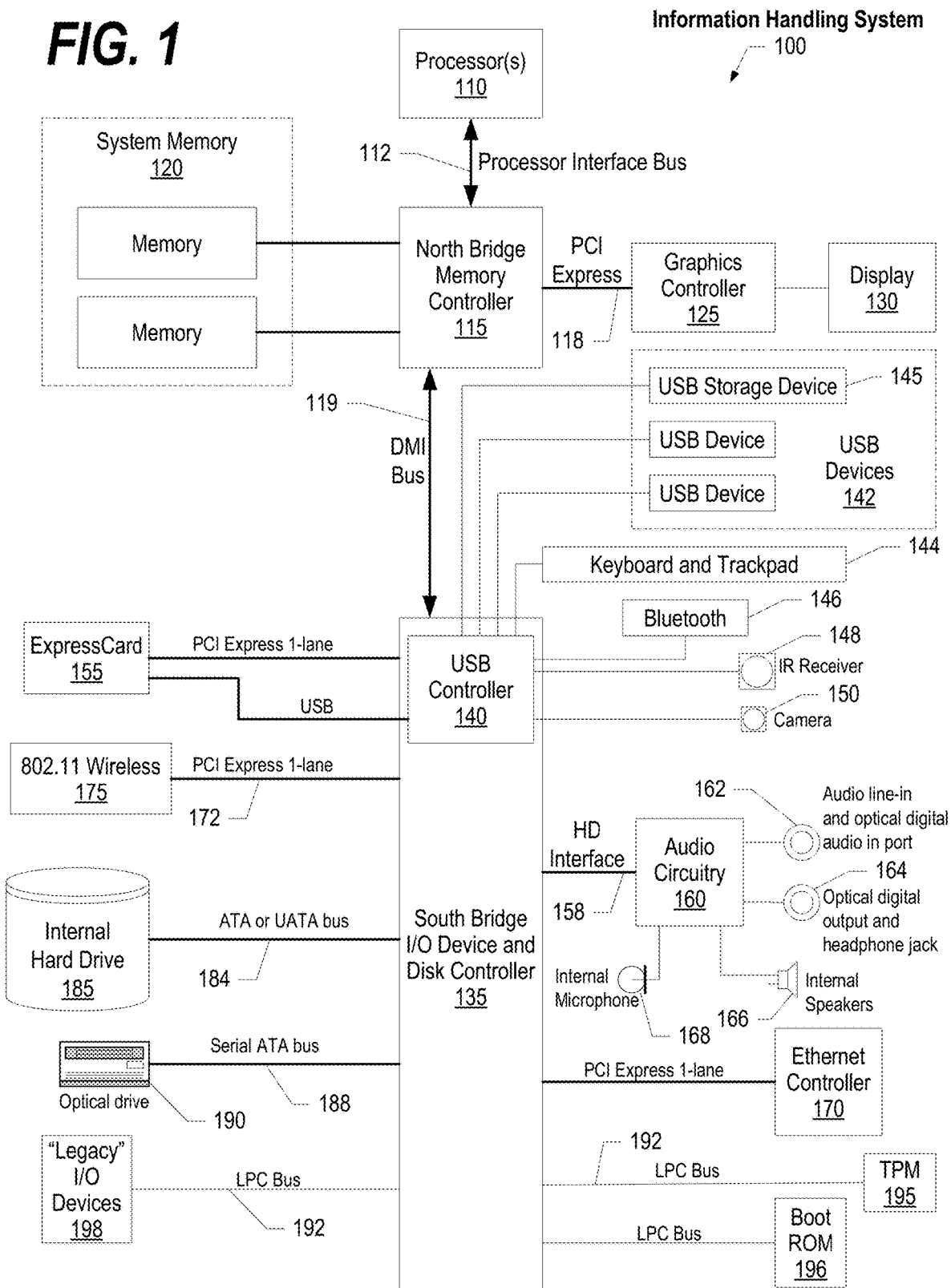
FIG. 1 depicts a block diagram of a processor and components of an information handling system.

FIGS. 1-6 show an approach for leveraging a device's context (e.g., by including sensor data, user-device interaction data, etc.) for providing enhanced on-device data protection. Based on the risk associated with the current context or based on mandatory security policies (such as corporate policies), the data is selectively encrypted and the decryption key is deleted from the mobile device. The decryption key can be retrieved from its server (or cloud) backup only after satisfying additional credential and context-driven requirements. Alternatively, the decryption key could be derived from users' authentication credentials.

For the use case of offline mode, a trusted software agent running on the device analyzes the context of the device to determine that the device is in an unknown location with no internet connectivity, it will delete the encryption key. As a result, the adversary would not be able to decrypt the data even if it can scrape the data from the device. For the online use case, the software agent can determine that the user is currently in an unknown, crowded location (with higher risk) or his access patterns are anomalous, it can proactively delete the encryption key to prevent any unauthorized data access.

A trusted software agent is installed as an application from a trusted app store (e.g. a corporate store). This agent would be given permissions to access the device sensors for resolving the mobile context. Note that the trusted agent has only app-level permissions and therefore cannot freely access data for other applications. In order to encrypt/decrypt data for other applications, the approach overcomes such access limitations imposed by the mobile operating system.

Two approaches can be used overcome access limitations imposed by the mobile operating system. First, in-house applications are signed with the same developer key as that of the trusted agent. Second, third-party applications are wrapped/instrumented to mediate access to the data to be protected. Such one-time automated instrumentation could be done at the app-store level or by any trusted entity (such as the corporate admin) before the app installation. The trusted agent monitors the context of the device (either periodically or based on a trigger event) to determine when to delete the encryption key from the device. In order to reduce the encryption/decryption overhead, the data to be encrypted could be selectively chosen (e.g. based on its sensitivity in certain contextual situations). The usage patterns of the device could be analyzed to determine the ideal situation (time, location, etc.) in which the data is encrypted (e.g. when the device is connected to a power source and not being used).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
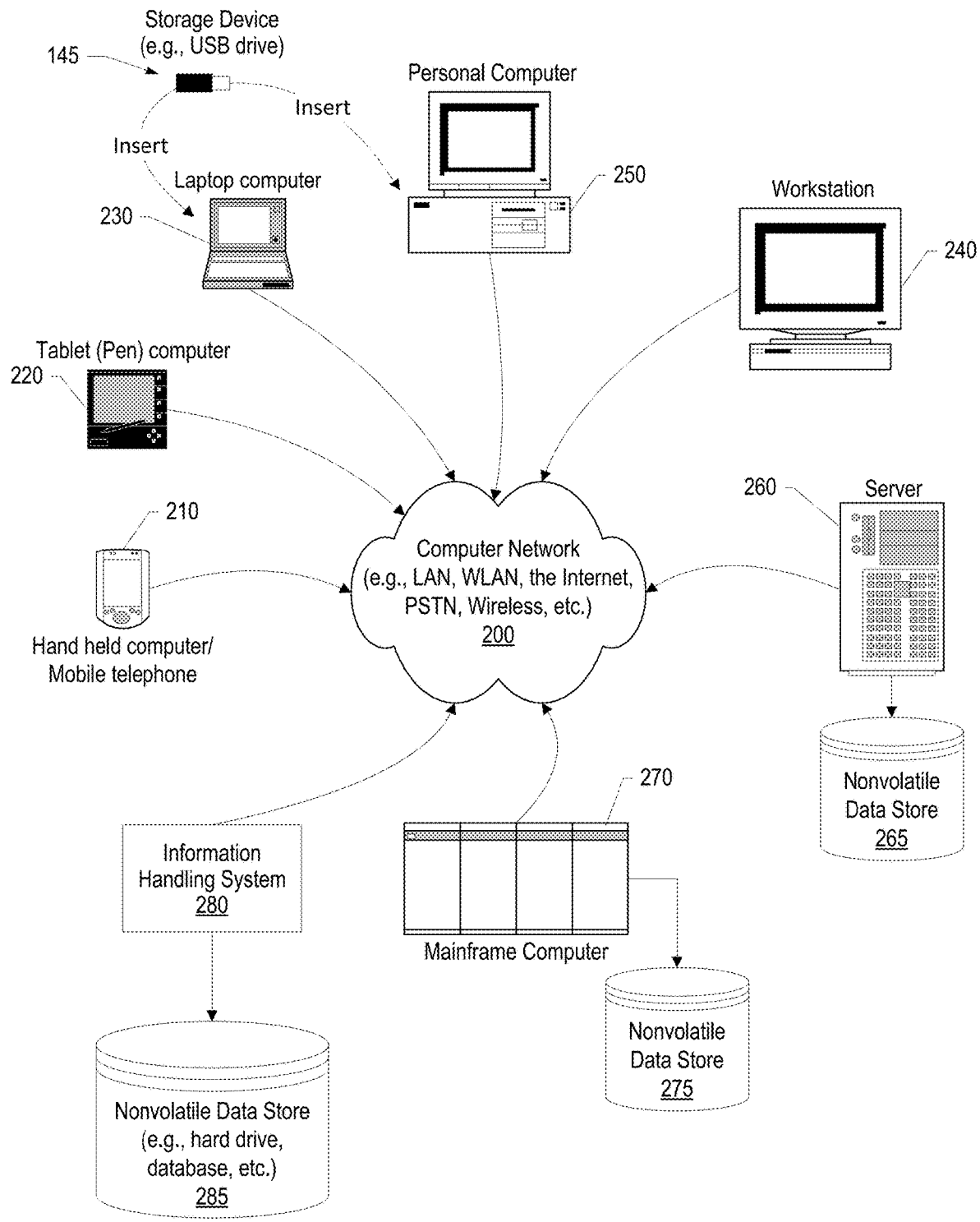
FIG. 2 is a network environment that includes various types of information handling systems interconnected via a computer network.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
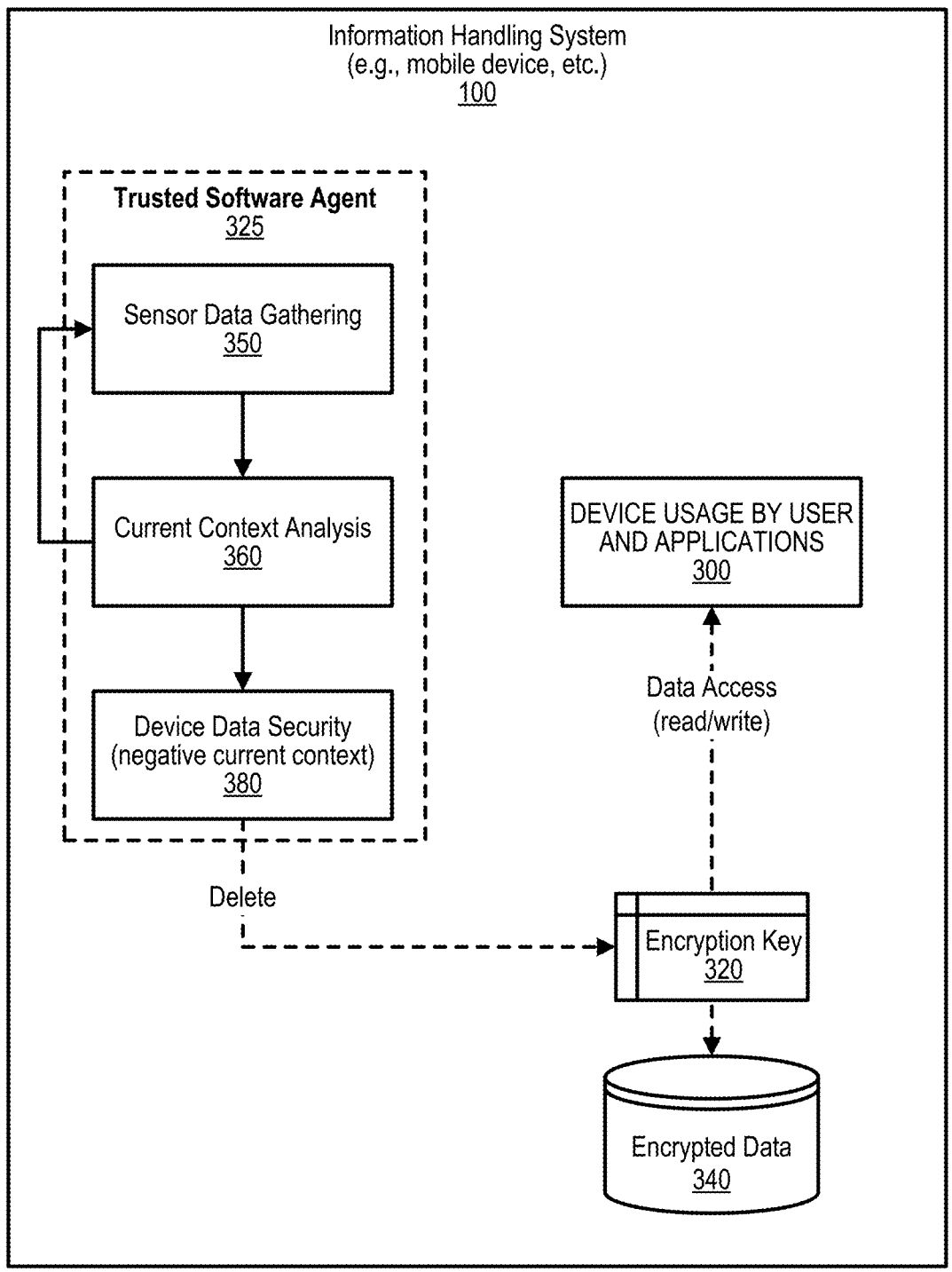
FIG. 3 is a diagram depicting components used in protecting data on a mobile device based on the context of the device.

FIG. 3 is a diagram depicting components used in protecting data on a mobile device based on the context of the device. Information handling system 100, such as a mobile computing device (e.g., smart phone, tablet computer system, etc.) has encrypted data 340 that is stored and retrieved using encryption/decryption key 320. Process 300 depicts usage of the mobile device by a user as well as by applications stored on the device. The user, through the use of such applications, accesses encrypted data 340 with the accesses being facilitated by the operating system that writes data to nonvolatile storage 340 using encryption/decryption key 320 and also retrieves data from nonvolatile 340 using the encryption/decryption key.

Trusted software agent 325 runs on information handling system and analyzes the context of the device to determine whether the device is in an unsafe, or negative, context, in which case the software agent will erase encryption/decryption key 320 preventing further reads, or accesses, of encrypted data 340. As a result, an adversary, such as a hacker, other malevolent user, or data thief, would be unable to decrypt the data. When the system is online, the same trusted software agent can determine that the user is currently in an unknown, crowded location (with higher risk) or his access patterns are anomalous, it can proactively delete the encryption/decryption key 320 to prevent any unauthorized data access.

Trusted software agent 325 is installed as an application from a trusted app store (e.g. a corporate store). In FIG. 3, the trusted software agent is depicted as including sensor data gathering component 350 that gathers sensory data from both the external environment (e.g., utilizing GPS data, etc.) as well as user-interaction data pertaining to activities the current user is taking on the device (e.g., trying to dump data from the device, etc.). Trusted software agent 325 also includes current context analysis component 360 that analyzes the current context of the device to determine whether a negative current context exists on the device that would necessitate the removal of encryption/decryption key 320 to protect the data on the device. When a negative current context is detected, then the current context analysis component 360 calls device data security component 380 to take appropriate security actions, including but not limited to erasing encryption/decryption key 320 to prevent access of the data by non-authorized users.

Trusted software agent 325 would be given permissions to access the device sensors for resolving the mobile context. Note that the trusted agent has only app-level permissions and therefore cannot freely access data for other applications. In order to encrypt/decrypt data for other applications, the approach overcomes such access limitations imposed by the mobile operating system.

Two approaches can be used overcome access limitations imposed by the mobile operating system. First, in-house applications are signed with the same developer key as that of the trusted agent. Second, third-party applications are wrapped/instrumented to mediate access to the data to be protected. Such one-time automated instrumentation could be done at the app-store level or by any trusted entity (such as the corporate admin) before the app installation. Trusted software agent 325 monitors the context of the device (either periodically or based on a trigger event) to determine when to delete the encryption key from the device. In order to reduce the encryption/decryption overhead, the data to be encrypted could be selectively chosen (e.g. based on its sensitivity in certain contextual situations). The usage patterns of the device could be analyzed to determine the ideal situation (time, location, etc.) in which the data is encrypted (e.g. when the device is connected to a power source and not being used).

Figure 4:
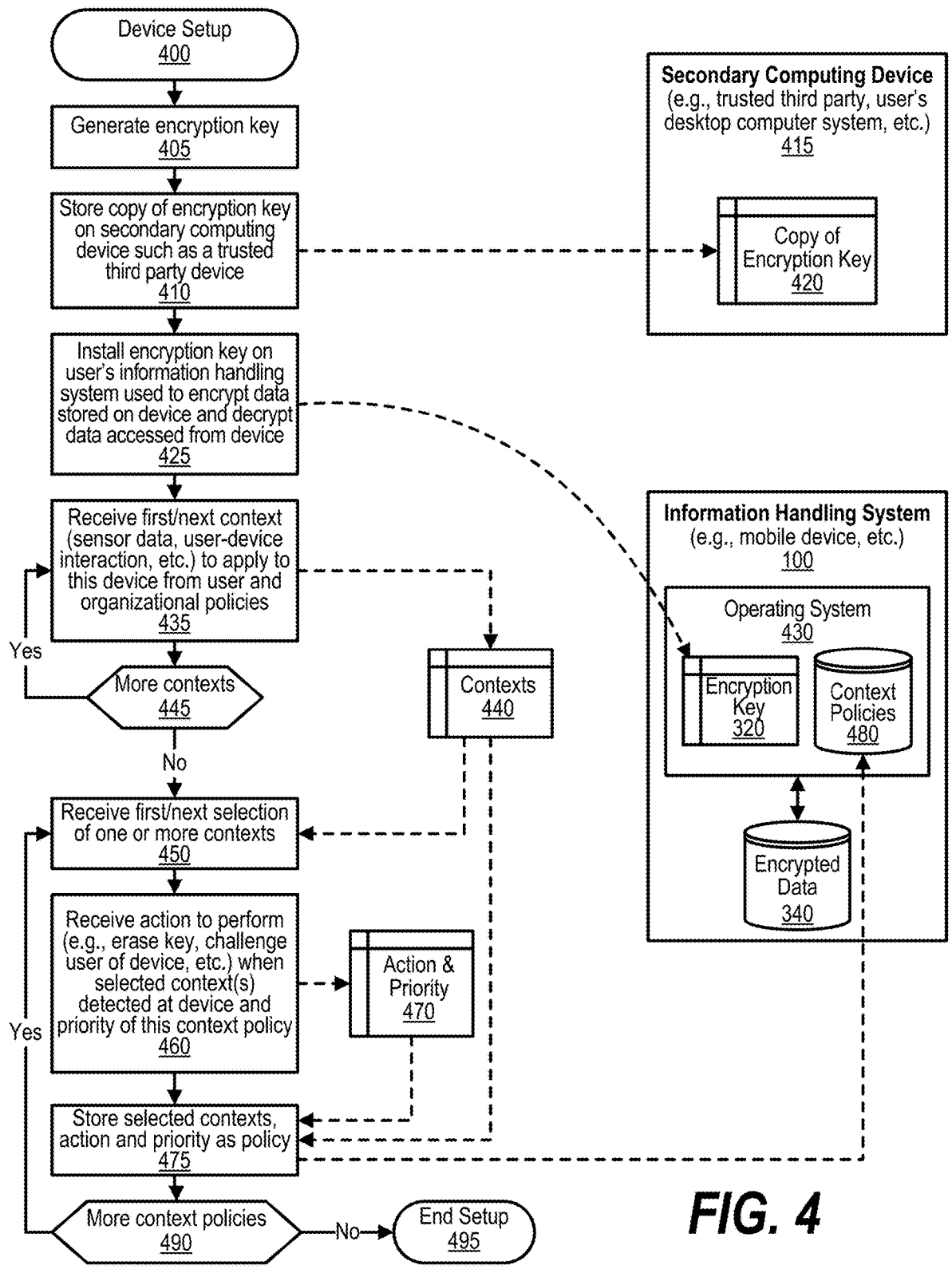
FIG. 4 is a flowchart showing setup steps taken on the device to enable data protection on the device based on the context of the device.

FIG. 4 is a flowchart showing setup steps taken on the device to enable data protection on the device based on the context of the device. FIG. 4 processing commences at 400 and shows the steps taken by a process that performs setup on a mobile device to protect data that is stored on the device. At step 405, the process generates the encryption/decryption key. At step 410, the process stores a copy of the encryption/decryption key on secondary computing device 415, such as a trusted third party device or the IT department of the organization that manages the mobile device. The copy of the encryption/decryption key is stored in data store 420. If the encryption/decryption key stored on the mobile device is ever erased in order to prevent unauthorized access to the data stored on the device, then the user can have the encryption/decryption key recovered from the trusted third party upon providing proper credentials.

At step 425, the process installs encryption/decryption key 320 on the user's information handling system that is used to encrypt data stored on device and decrypt data accessed from device. As shown, in one embodiment, encryption/decryption key 320 is controlled by operating system 430 that runs on the mobile device and that is used to store and retrieve encrypted data from data store 340. At step 435, the process receives the first context data (e.g., sensor data, user-device interaction, etc.) that the user wishes to apply to this device. The user, in this case, might be an IT professional at the organization that sets up mobile devices and configures the contexts that are considered negative, or unsafe, for a particular mobile device. The process stores the received context data in contexts memory area 440. The process determines as to whether there are more contexts that the user wishes to configure (decision 445). If there are more contexts that the user wishes to configure, then decision 445 branches to the 'yes' branch which loops back to step 435 to receive the next context data. This looping continues until there are no more contexts that the user wishes to configure, at which point decision 445 branches to the 'no' branch exiting the loop.

Steps 450 through 495 are performed to define the negative current contexts of the mobile device. These negative current contexts are encapsulated in context policies that are stored in data store 480. During use of the mobile device, when a negative current context is encountered, security steps are performed to protect the data stored on the mobile device. One possible security step is to erase, or delete, the encryption/decryption key that is stored on the device thus preventing someone from being able to read the data. For example, a negative current context can be indicative of loss or misappropriation of the mobile device or a current non-secure environment. Thus, the user would configure the context policies to contain negative contexts such as sensed biometric data belonging to some one other than the authorized user of the device, an inability for a current user to enter security credentials or a deviation from locations habitually travelled by the authorized user.

At step 450, the process receives from the user a first selection of one or more contexts that the user wants to use for a context policy. At step 460, the process receives an action that is to be performed (e.g., erase key, challenge user of device, etc.) when the selected context(s) are detected at the device along with a priority of this context policy. Process 460 stores the data in action and priority memory area 470. At step 475, the process stores the selected contexts, the received action and the received priority as a context policy. Process 475 stores the context policy in data store 480. The process determines as to whether there are more context policies that the user wants to configure for this mobile device (decision 490). If there are more context policies that the user wants to configure for this device, then decision 490 branches to the 'yes' branch which loops back to step 450 to configure the next context policy. This looping continues until there are no more context policies that the user wants to configure for this device, at which point decision 490 branches to the 'no' branch exiting the loop. FIG. 4 processing thereafter ends at 495.

Figure 5:
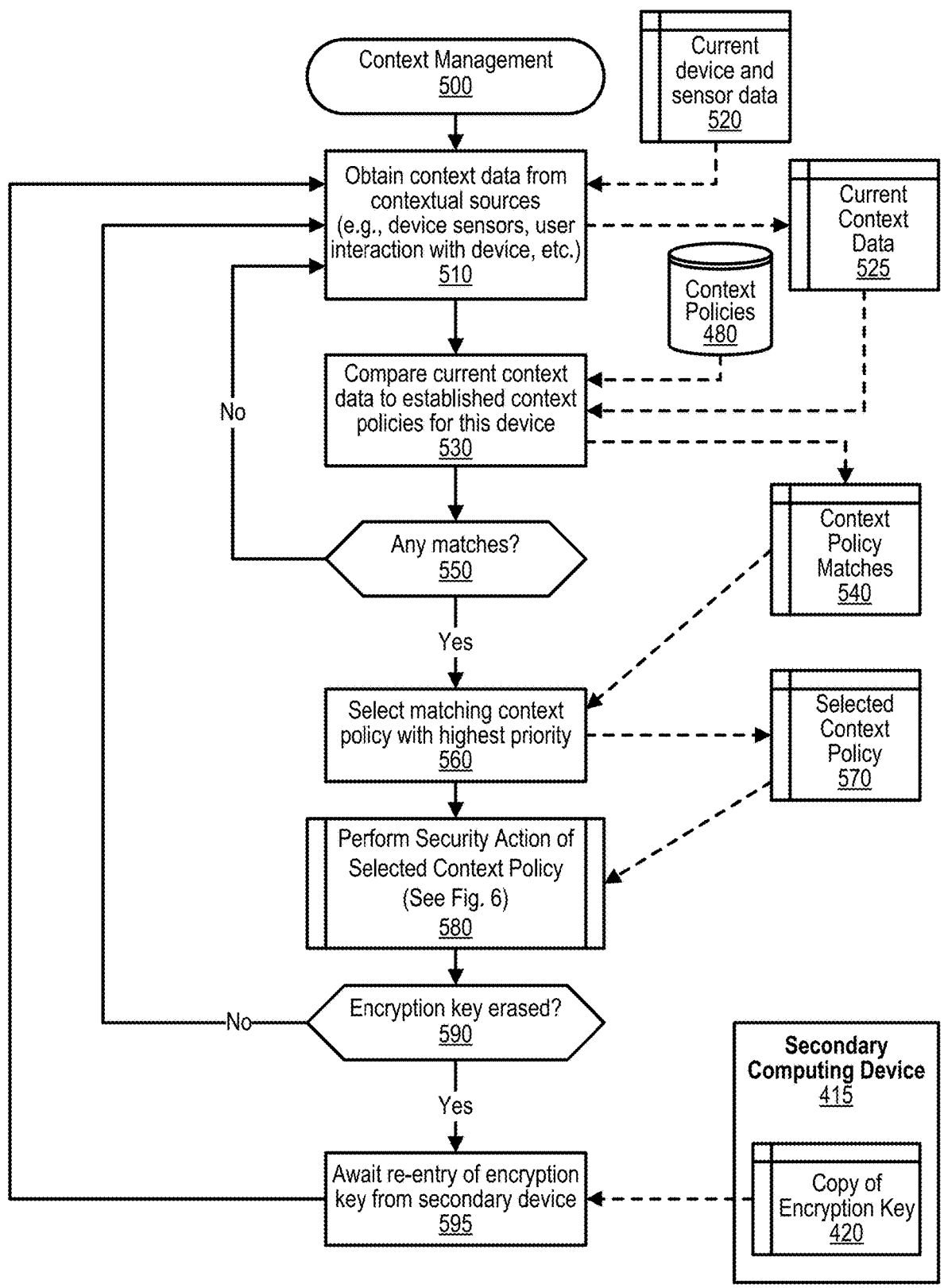
FIG. 5 is a flowchart showing context management steps performed on the device to monitor the context of the device.

FIG. 5 is a flowchart showing context management steps performed on the device to monitor the context of the device. FIG. 5 processing commences at 500 and shows the steps taken by a process that performs context management on the mobile device. At step 510, the process obtains context data from contextual sources (e.g., device sensors, user interaction with device, etc.). Step 510 reads current device and sensor data from memory area 520. The current context data pertaining to the mobile device (e.g., user-interaction with the device, current geographic location of the device, etc.) are stored in memory area 525. At step 530, the process compares the current context data stored in memory area 525 to the context policies established for this device that are retrieved from data store 480. The context policy, or policies, that matched the current context data are stored in memory area 540.

The process determines as to whether the current context data matches any of the context policies established for this device (decision 550). If the current context data matches any of the context policies established for this device (indicating a potential security issue), then decision 550 branches to the 'yes' branch for further processing. On the other hand, if the current context data fails to match any of the context policies established for this device, then decision 550 branches to the 'no' branch which loops back to step 510 to continue obtaining and analyzing context data for any potential security threats. If a threat is detected by the current context data matching any of the context policies established for this device, then decision 550 branches to the 'no' branch to perform steps 560 through step 595. At step 560, the process selects the context policy with the highest priority from memory area 540. This selected context policy is stored in memory area 570. At predefined process 580, the process performs the Perform Security Action of Selected Context Policy routine (see FIG. 6 and corresponding text for processing details).

Based on the operation of predefined process 580, the encryption/decryption key on the device may be erased. The process determines as to whether the encryption/decryption key was erased by the execution of predefined process 580 (decision 590). If the encryption/decryption key was erased, then decision 590 branches to the 'yes' branch to perform step 595. On the other hand, if the encryption/decryption key was not erased, then decision 590 branches to the 'no' branch which loops back to step 510 to continue obtaining and analyzing context data for any potential security threats.

At step 595, the process awaits the re-entry of the encryption/decryption key from secondary computing device 415, such as a trusted third party.

Figure 6:
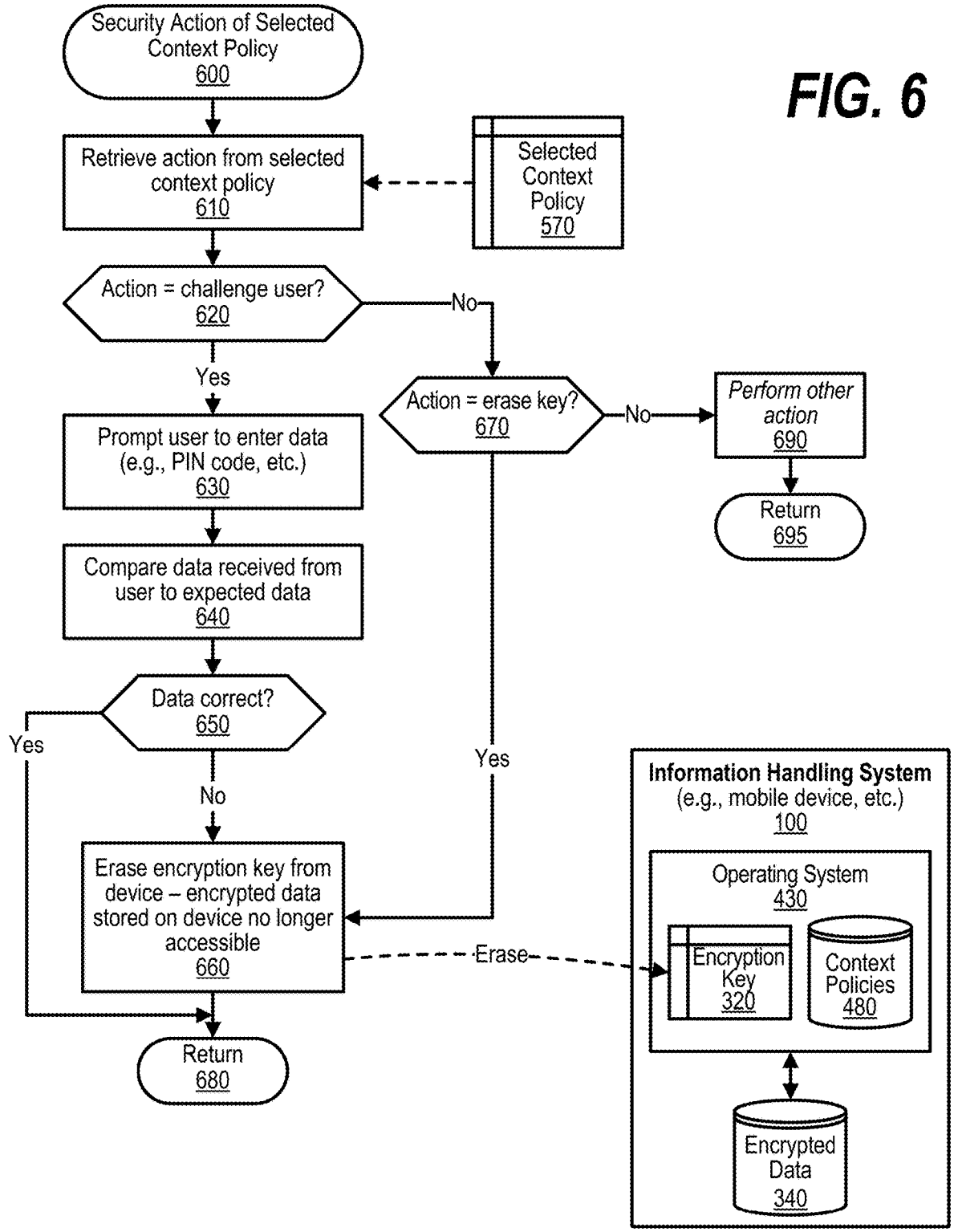
FIG. 6 is a flowchart showing security action steps performed when the current context of the device matches one or more context security policies.

FIG. 6 is a flowchart showing security action steps performed when the current context of the device matches one or more context security policies. FIG. 6 processing commences at 600 and shows the steps taken by a process that performs the security action that is associated with the selected context policy. At step 610, the process retrieves the action from the selected context policy with the action being retrieved from memory area 570.

The process determines as to whether the action is a challenge to the user to enter a secret code (decision 620). If the action is a challenge to the user to enter a secret code, then decision 620 branches to the 'yes' branch to perform steps 630 through 650. On the other hand, if the action is not a challenge to the user to enter a secret code, then decision 620 branches to the 'no' branch bypassing steps 630 through 650.

If the action is a challenge to the user to enter a secret code, then steps 630 through 650 are performed. At step 630, the process prompts the user to enter the secret code on the mobile device (e.g., PIN code, etc.). At step 640, the process compares the data received from user to the expected data. The process determines as to whether the data entered by the user is correct (decision 650). If the data is correct, then decision 650 branches to the 'yes' branch bypassing step 660, thus leaving encryption/decryption key 320 intact. On the other hand, if the user did not supply the correct secret code, then decision 650 branches to the 'no' branch to perform step 660 that erases encryption/decryption key 320 from the mobile device.

Returning to decision 620, if the action is not to challenge the user, then the process next determines as to whether the action is to immediately erase the encryption/decryption key from the mobile device (decision 670). If the action is to immediately erase the encryption/decryption key from the mobile device, then decision 670 branches to the 'yes' branch to perform step 660 that erases encryption/decryption key 320 from the mobile device. On the other hand, if the action is not to immediately erase the encryption/decryption key from the mobile device, then decision 670 branches to the 'no' branch whereupon, at step 690, some other action is performed at the mobile device and processing returns to the calling procedure at 695.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for data protection in a mobile device comprising steps of:
    installing, by the mobile device, an encryption/decryption key, wherein the encryption/decryption key encrypts data stored on the mobile device and decrypts data accessed from the mobile device;
    monitoring, by a trusted software agent application executing on the mobile device, a set of sensor data at the mobile device to determine a current context of the mobile device, wherein the current context includes a current location of the mobile device, and wherein the monitoring is performed while the mobile device is not connected to a network;
    determining, based on the sensor data, that the current location of the mobile device indicates that the mobile device has moved from one or more known locations to an unknown location with no network connectivity; and
    in response to the determining, deleting, by the trusted software agent application, the encryption/decryption key from the mobile device, wherein deleting the encryption/decryption key renders encrypted data on the mobile device inaccessible to users of the mobile device.

2. The method of claim 1 wherein the sensor data includes external sensor data obtained by one or more external sensors accessible by the mobile device and user-interaction data obtained by monitoring a user's interaction with the mobile device.

3. The method of claim 1 further comprising:
    configuring the data protection in the mobile device prior to the monitoring, wherein the configuring further comprises:
        generating the encryption/decryption key;
        storing the encryption/decryption key in a memory of the mobile device; and
        storing a copy of the encryption/decryption key on a secondary computing device.

4. The method of claim 1 further comprising:
    configuring the data protection in the mobile device prior to the monitoring, wherein the configuring further comprises:
        establishing one or more contexts that can be matched to the set of sensor data; and
        defining one or more context policies based on the established contexts.

5. A mobile device comprising:
    one or more processors;
    a memory coupled to at least one of the processors; and
    a set of computer program instructions stored in the memory and executed by at least one of the processors in order to perform actions comprising:
        installing an encryption/decryption key, wherein the encryption/decryption key encrypts data stored on the mobile device and decrypts data accessed from the mobile device;
        monitoring, by a trusted software agent application executing on the mobile device, a set of sensor data at the mobile device to determine a current context of the mobile device, wherein the current context includes a current location of the mobile device, and wherein the monitoring is performed while the mobile device is not connected to a network;
        determining, based on the sensor data, that the current location of the mobile device indicates that the mobile device has moved from one or more known locations to an unknown location with no network connectivity; and
        in response to the determining, deleting, by the trusted software agent application, the encryption/decryption key from the mobile device, wherein deleting the encryption/decryption key renders encrypted data on the mobile device inaccessible to users of the mobile device.

6. The mobile device of claim 5 wherein the sensor data includes external sensor data obtained by one or more external sensors accessible by the mobile device and user-interaction data obtained by monitoring a user's interaction with the mobile device.

7. The mobile device of claim 5 wherein the actions further comprise:
    configuring the data protection in the mobile device prior to the monitoring, wherein the configuring further comprises:
        generating the encryption/decryption key;
        storing the encryption/decryption key in the memory; and
        storing a copy of the encryption/decryption key on a secondary computing device.

8. The mobile device of claim 5 wherein the actions further comprise:
    configuring the data protection in the mobile device prior to the monitoring, wherein the configuring further comprises:
        establishing one or more contexts that can be matched to the set of sensor data; and
        defining one or more context policies based on the established contexts.

9. A computer program product stored in a computer readable storage medium, comprising computer program code that, when executed by an information handling system, performs actions comprising:
    installing an encryption/decryption key on a mobile device, wherein the encryption/decryption key encrypts data stored on the mobile device and decrypts data accessed from the mobile device;
    monitoring, by a trusted software agent application executing on the mobile device, a set of sensor data at the mobile device to determine a current context of the mobile device, wherein the current context includes a current location of the mobile device, and wherein the monitoring is performed while the mobile device is not connected to a network;
    determining, based on the sensor data, that the current location of the mobile device indicates that the mobile device has moved from one or more known locations to an unknown location with no network connectivity; and
    in response to the determining, deleting, by the trusted software agent application, the encryption/decryption key from the mobile device, wherein deleting the encryption/decryption key renders encrypted data on the mobile device inaccessible to users of the mobile device.

10. The computer program product of claim 9 wherein the sensor data includes external sensor data obtained by one or more external sensors accessible by the mobile device and user-interaction data obtained by monitoring a user's interaction with the mobile device.

11. The computer program product of claim 9 wherein the actions further comprise:
configuring the data protection in the mobile device prior to the monitoring, wherein the configuring further comprises:
generating the encryption/decryption key;
storing the encryption/decryption key in a memory of the mobile device; and
storing a copy of the encryption/decryption key on a secondary computing device.

12. The method of claim 3 further comprising:
in response to deleting the encryption/decryption key from the mobile device, receiving one or more credentials from a first user of the mobile device; and
in response to receiving the one or more credentials, recovering the encryption/decryption key from the secondary computing device.

13. The mobile device of claim 7 further wherein the actions further comprise:
in response to deleting the encryption/decryption key from the mobile device, receiving one or more credentials from a first user of the mobile device; and
in response to receiving the one or more credentials, recovering the encryption/decryption key from the secondary computing device.

14. The computer program product of claim 11 wherein the actions further comprise:
in response to deleting the encryption/decryption key from the mobile device, receiving one or more credentials from a first user of the mobile device; and
in response to receiving the one or more credentials, recovering the encryption/decryption key from the secondary computing device.

* * * * *